United States Patent Office 2,777,076
Patented Jan. 8, 1957

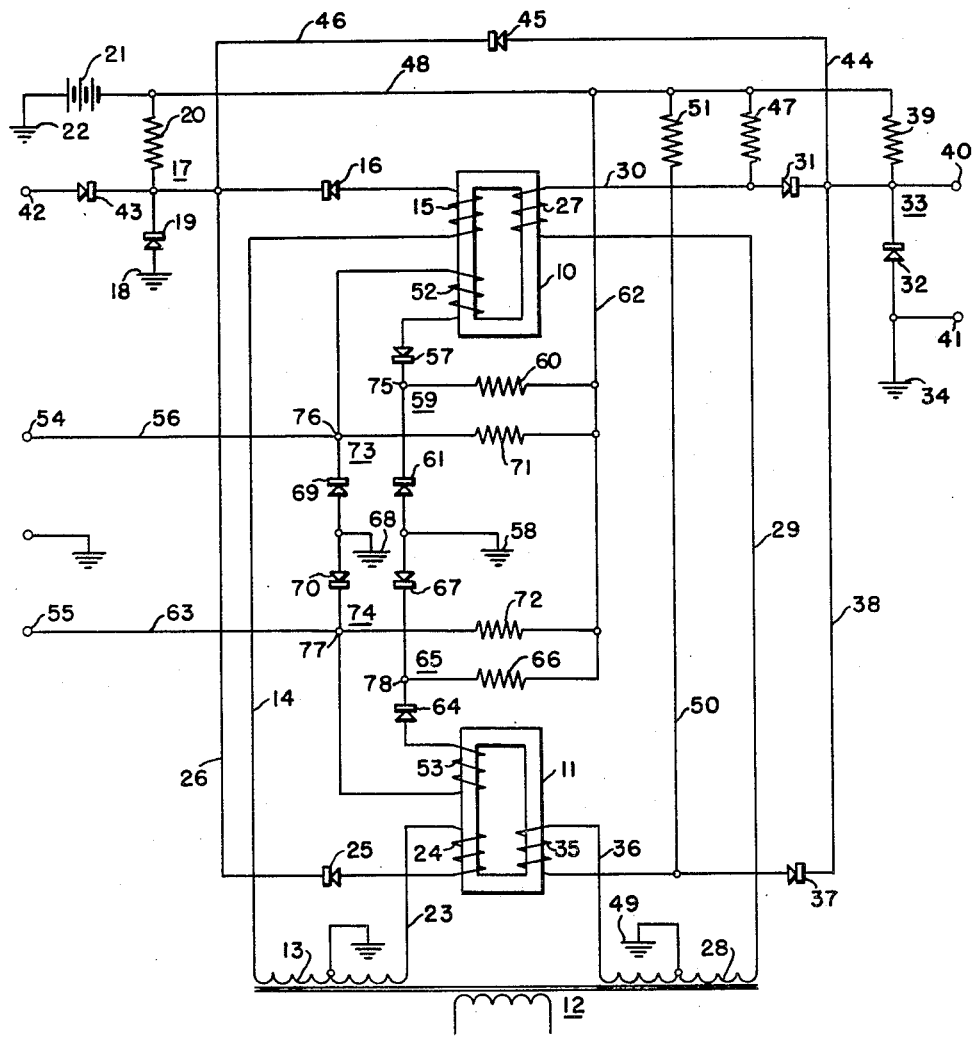

2,777,076

FLIP-FLOP ELEMENTS FOR CONTROL SYSTEMS

Harley A. Perkins, Jr., Baldwin Township, Allegheny County, Pa., assignor to Westinghouse Electric Corporation, East Pittsburgh, Pa., a corporation of Pennsylvania Application September 19, 1955, Serial No. 534,983

3 Claims. (Cl. 307—88)

The invention relates, generally, to control systems and, more particularly, to flip-flop elements for control systems.

An object of the invention is to provide a flip-flop element for a control system that will function properly when connected to a low impedance power system.

It is also an object of the invention to provide for maintaining equipotential between circuit sections connected to ground when such circuits are not receiving signals to protect the flip-flop element from the effect of stray currents.

Other objects of the invention will, in part, be obvious and will, in part, appear hereinafter.

The invention, accordingly, comprises the features of construction, combination of elements and arrangement of parts which will be exemplified in the system hereinafter set forth, and the scope of the application of which will be indicated in the claims.

For a fuller understanding of the nature and objects of the invention, reference should be had to the following detailed description taken in connection with the accompanying schematic diagram, the single figure of which is a circuit diagram of a flip-flop element of a control system embodying the features of the invention.

Referring now to the drawing, the flip-flop element for a control system to be disclosed herein is provided with two cores 10 and 11, each of which carries a plurality of coils utilized for driving the cores toward positive and negative saturation alternately. In addition, the coils are provided with resetting and gating circuits so connected to a source of power, such as a transformer shown generally at 12, that the required circuits are established for effecting the positive and negative saturation of the cores alternately.

A number of non-linear devices are employed with the circuits to be described and traced hereinafter. The non-linear devices are so disposed in relationship with the circuits that they permit the flow of a predetermined magnetizing current to the coils or windings on the core members without any substantial voltage drop, and they also protect the circuits and apparatus from excessive current flow. Further, as the description proceeds and the circuits are traced, it will seem that the electric currents flow through the rectifiers or diodes in the backward or reversed direction, however, what actually happens is that there is a reduction in the electric current flow in the forward direction in the circuits. The reduction in current flow may be predetermined by design to effect the performance of functions required from the control system of which the flip-flop element is a part.

In order to explain this embodiment of the flip-flop element for a control system embodying the inventive features, the circuits will now be traced and the functioning of the invention will be revealed as the specification proceeds.

The reset circuit for core 10 extends from one terminal of the secondary winding 13 of the transformer 12 through conductor 14, the reset coil 15 of the core 10, the rectifier 16 through a non-linear device shown generally at 17 to ground at 18. In a normal operation of the flip-flop element, the coil 15 will drive the core 10 to negative saturation.

The non-linear device 17 comprises a rectifier 19 connected to the ground at 18 and a resistor 20 connected to the negative pole of the battery 21. The positive pole of the battery is connected to the ground at 22.

Non-linear devices of this kind are well known in the art and need not be described in detail. It is sufficient to say that for small currents they offer low impedance to the flow of current, and as the current increases, the build-up of resistance is sufficient to protect the elements of the circuits from excessive current flow.

A reset circuit for the core 11 may be traced from the other terminal of the secondary winding 13, through conductor 23, reset coil 24, rectifier 25, conductor 26, rectifier 19 of the non-linear device 17 to ground at 18. This reset coil 24 is so connected that on the next or second half cycle, it will drive the core 11 to negative saturation.

In the operation of the circuit when on one or the first half cycle, the resetting circuit for core 10 drives the core to negative saturation, on the second half cycle of current the coil 24 will drive the core 11 to negative saturation. Thus, we have two resetting circuits for the cores 10 and 11 which drive their respective cores to negative saturation alternately.

As pointed out hereinbefore, the cores 10 and 11 have gating circuits. The gating circuit for the coil 27 of the core 10 extends from one terminal of the secondary winding 28 of the transformer 12 through conductor 29, the gating coil 27, conductor 30, rectifier 31, through the non-linear device shown generally at 33 to ground at 34.

As illustrated, the gating coil 35 of the core 11 is connected to the opposite terminal of the secondary 28 of the transformer 12. The gating circuit may be traced from the transformer through the conductor 36, the gating coil 35, rectifier 37, conductor 38, through the non-linear device 33 to ground at 34.

It will be obvious from the gating circuits traced that when the core 10 is driven to positive saturation on one half-cycle the core 11 will be driven to positive saturation on the following cycle.

The non-linear device shown generally at 33 comprises the resistor 39 connected to the negative terminal of battery 21, the rectifier 32 connected to ground 34 and to the positive terminal of battery 21 through ground 22.

As shown, the flip-flop circuit element is provided with output terminals 40 and 41 from which an output may be delivered in a manner to be described hereinafter to perform some useful function in a control system. The voltage of the output will depend on the design of the flip-flop circuit element and the winding 28 of transformer 12.

The flip-flop element, thus far described, includes a transformer 12, cores 10 and 11, reset circuits, and gating circuits for each core, and output terminals. Therefore, when the transformer 12 is energized, the cores 10 and 11 will be driven to positive and negative saturation alternately. Assuming now that on the first half-cycle, the core 10 is driven to negative saturation, then the core 11 is driven to positive saturation. On the next half-cycle, the gating circuit for the coil 27 will overcome the negative saturation of the core 10 and drive it to positive saturation, while the reset circuit for the coil 24 of the core 11 will overcome the positive saturation of the core and drive it to negative saturation. The flip-flop circuit element will thus continue to alternate the positive and negative saturations of the cores 10 and 11 until they are interrupted in a manner described hereinafter.

A circuit is provided through which a signal may be delivered to a flip-flop element. This circuit extends from a terminal 42 through the rectifier 43, a non-linear device shown generally at 17 to the rectifiers 16 and 25. The signal delivered will usually be direct current and of a magnitude greater than the voltage supplied across the coils 15 and 24 during the reset signal. Therefore, when a signal is delivered through the terminal 42, it will block the flow of current through the reset coils 15 and 24.

Assuming now that the core 10 has been driven to positive saturation by the current flowing in the gating coil 27 and that the signal to the terminal 42 is applied at that instant, then the result is that the core 10 remains positively saturated during the following half-cycle which would normally be a resetting half-cycle for the core 10. On the next half-cycle, which is a gating half-cycle for the core 10, the current delivered from the secondary winding 28 of the transformer 12 will not be utilized to drive the core 10 to positive saturation, but instead, will build up a voltage about the output terminals 40 and 41.

During the gating half-cycle for the core 10 that produces a voltage across the terminals 40 and 41, a resetting half-cycle will occur for the core 11. A signal is now received through the terminal 42, rectifier 43, non-linear device 17 and conductor 26 to the rectifier 25. The flow of current through the resetting coil 24 in the direction to drive the core 11 to negative saturation is blocked. Therefore, the core remains positively saturated, and on the following half-cycle the current delivered from the secondary winding 28 of the transformer 12 will not be utilized in overcoming the negative saturation of the core 11, and will build up a voltage across the terminals 40 and 41 through the gating circuit already traced.

Therefore, when the signal is delivered through the terminal 42, the cores 10 and 11 will alternately produce a voltage across the terminals 40 and 41, which voltage will be maintained as long as the signal delivered at 42 continues. Whether or not such an output voltage across the terminals 40 and 41 continues during the period of reception of the signal will be determined by use to which the flip-flop circuit element is to be applied.

In order to provide for maintaining an output across the terminals 40 and 41 after the signal delivered at 42 is discontinued, a feedback circuit is provided. This feedback circuit extends from the terminal 40 through conductor 44, rectifier 45, conductor 46, to the rectifiers 16 and 25. This feedback circuit will block the flow of current from the secondary winding 13 from the transformer 12 through the resetting coils 15 and 24 since the output voltage is by design always greater than resetting voltage. When this feedback circuit is provided, a gating circuit for the coils 27 and 35 will maintain an output voltage across the terminals 40 and 41, irrespective of whether or not a signal is being received through terminal 42.

It has been found that even with the feedback circuit described hereinbefore, that due to leakage of the rectifiers and the fact that a perfect hysteresis loop for the cores 10 and 11 is never obtained, that the flux in the cores 10 and 11 will decay rapidly. Generally, the positive saturation of the cores with the feedback circuits will not last more than about 20 seconds after the signal received at 42 is discontinued.

When the positive saturation of the cores 10 and 11 disappears, the flip-flop circuit element can no longer deliver an output. In other words, it no longer stores a signal. Thus, the storing of a signal or the memory of the flip-flop element will only last until the positive saturation of the cores decays through this well-known process.

In order to store signals for any predetermined length of time, circuits are provided for maintaining the positive saturation for the cores 10 and 11 after an output has been built up across the terminals 40 and 41 through the positive saturation of the cores 10 and 11. The circuit for maintaining positive saturation of the core 10 may be traced from one terminal of the secondary winding 28 of the transformer 12 through conductor 29, the gating coil 27, conductor 30, resistor 47, conductor 48, battery 21 to the ground at 22 back to the ground 49 of the transformer 12. The circuit for maintaining the positive saturation of the core 11 extends from the other terminal of the transformer 28 of the transformer 12 through conductor 36, a gating coil 35, conductor 50, resistor 51, conductor 48, battery 21 to ground 22 and back through the ground 49 to the transformer 28.

It has been found that the resistors 47 and 51 may be designed to give the correct current flow for maintaining the cores positively saturated for days.

In a flip-flop circuit element, in which the transformer voltage was 110 and the resistors 47 and 51 had a resistance value of 200,000 ohms, a signal was stored for days. In order to meet some applications of the flip-flop circuit element, it may be desirable to interrupt the output to the terminals 40 and 41 even when a signal is being supplied to the terminal 42. In cases where the flip-flop circuit element is applied in the control of automatic machinery, the interruption of the output at any time may become highly desirable.

In order to give an operator control of the flip-flop circuit element so that he may interrupt the output at terminals 40 and 41 at will, third coils 52 and 53 are provided on cores 10 and 11 respectively. These coils will be so designed and supplied with adequate current to effect the driving of the cores 10 and 11 to negative saturation irrespective of the magnetic conditions developed by the other coils on the cores. The current for energizing the current for coils 52 and 53 will be energized from an independent power source.

In this embodiment of the invention, two terminals 54 and 55 are provided for delivering a signal to the coils 52 and 53 respectively. It has been found that if the power source from which the signal is delivered to the terminals 54 and 55 has a high impedance, a simple circuit through the coils 52 and 53 may be utilized. However, on occasions it has been found that the power source for delivering the signal to terminals 54 and 55 has a low impedance, and when a simple circuit without protective means is provided for delivering the signals to the coils 52 and 53 that there are may be sneak circuits or back current flow developed which will upset the proper functioning of the flip-flop circuit element.

In order to provide a flip-flop circuit element that may be connected to any power source irrespective of whether or not it has a low impedance, a special circuit system is provided for energizing the coils 52 and 53.

In this embodiment of the invention, the signal circuit for the coil 52 may be traced from the terminal 54 through conductor 56, the third coil 52 on the core 10, rectifier 57 to ground at 58 through the non-linear device shown generally at 59.

In this instance, the non-linear device comprises a resistor 60 and a rectifier 61. The rectifier 61 is connected to ground at 58. The terminal of the resistor 60 remote from the rectifier 61 is connected through conductors 62 and 48 to the battery 21 which is grounded at 22. The circuit for the third coil 53 and the core 11 may be traced from the terminal 55 through conductor 63, the coil 53, rectifier 64, and the non-linear device shown generally at 65 to ground at 58. As pointed out hereinbefore, the power source for the signal through the terminal 55 and the winding 53 will be so proportioned that the magnet 11 will be driven to negative saturation irrespective of the magnetic conditions established by the other coils on the core.

The non-linear device 65 comprises the resistor 66 and the rectifier 67. As shown, the rectifier 67 is connected to ground at 58. The resistor 66 is connected to one end of the rectifier 67 and through the conductors 62 and 48 to the battery 21 which, in turn, is grounded at 22.

In addition to the foregoing, the terminal 54 and conductor 56 are connected to a non-linear device shown generally at 73. The non-linear device shown at 73 comprises a resistor 71 and a rectifier 69. The rectifier 69 is connected to ground at 68, while the outer end of the resistor 71 is connected through conductors 62 and 48 to the battery 21 which is grounded at 22.

The terminal 55 and conductor 63 are connected to a non-linear device shown generally at 74. This non-linear device comprises a rectifier 70 and resistor 72. The rectifier is connected to ground at 68, while the outer end of resistor 72 remote from the rectifier 70 is connected through conductors 62 and 48 to the battery 21 which is grounded at 22.

Assuming now that current tends to flow from the ground 68 through rectifier 69, coil 52, rectifier 57, resistor 60, conductors 62 and 48 to ground at 22. This circuit will be blocked at the junction 75 because of the ground connection at 58 through rectifier 61. In other words, the junction point 76 and the junction point 75 are at the same potential and no current will flow.

In view of the circuits just traced hereinbefore, it will be obvious that the junction points 77 and 78 will be at the same potential and no current can flow from ground through the third coil 53 irrespective of whether or not the impedance condition found in the source of power supplying the terminal 55 is high or low.

Thus, we have a flip-flop circuit element that may be connected to any source of supply irrespective of the impedance conditions as hereinbefore stated, and there will be no sneak circuits established which will affect the expected functioning of the system. When the delivery of signals is discontinued, no circuits will be established through the coils 52 and 53, and the flip-flop element will remain ready to function on the delivery of signals through the terminals 54 and 55 to energize the third coils 52 and 53.

The system described gives a flip-flop element that may be energized effectively by an operator to interrupt the delivery of an output at will, thus giving the operator complete control of the system.

Since certain changes may be made in the above construction, and different embodiments in the invention could be made without departing from the scope, therefore, it is intended that all matter contained in the above description or shown in the accompanying diagram shall be interpreted as illustrative and not in a limiting sense.

I claim as my invention:

1. In a flip-flop element of a control system, in combination, a plurality of cores, a plurality of windings on each core, a source of power, a reset circuit connecting one winding of each core to the source of power, a gating circuit connecting another winding on each core to the power source, the reset circuits and the gating circuits being so connected that they function to drive the cores to positive and negative saturation alternately, means for delivering a signal to the reset windings to block their functioning, the gating circuits then functioning to build up an output voltage capable of performing a predetermined function, means for delivering a signal to a third coil on each core to drive the core to negative saturation, and means associated with the signal delivering means to prevent the flow of current from ground connections through the third coil on each core when the signals are discontinued.

2. In a flip-flop element in a control system, in combination, a plurality of cores, a plurality of windings on each core, a source of power, a reset circuit connecting one winding of each core to the source of power, a gating circuit connecting another winding on each core to the source of power, the reset circuits and the gating circuits being so connected that they function to drive the cores to positive and negative saturation alternately, means for delivering a signal to the reset windings to block their functioning, circuit connections for delivering a signal to a third coil on each core to drive the cores to negative saturation irrespective of the magnetic conditions existing in the cores, means connected into the signal circuit connections for delivering a signal to the third coils of the cores for preventing the flow of stray currents to the coils when signals are not being delivered.

3. In a flip-flop element of a control system, in combination a plurality of cores, a plurality of windings on each core, a source of power, a reset circuit connecting one winding of each core to the source of power, a gating circuit connecting another winding to each core to the source of power, the reset circuits and the gating circuits being so connected that they function to drive the cores to positive and negative saturation alternately, means for delivering a signal to the reset windings to block the functioning of the reset circuits, the gating windings then functioning to build up an output voltage capable of predetermined value, a plurality of circuits for delivering signals to third coils on each of the cores to drive the cores to a negative saturation irrespective of the magnetic conditions existing at the time, means connected in each of the signal circuits which function to maintain the circuits on each side of the coils at equal potential when not receiving signals to prevent the flow of stray currents.

No references cited.